United States Patent
Rajan et al.

(10) Patent No.: US 7,694,302 B1
(45) Date of Patent: *Apr. 6, 2010

(54) SYMMETRIC MULTIPROCESSOR SYNCHRONIZATION USING MIGRATING SCHEDULING DOMAINS

(75) Inventors: Vijayan Rajan, Sunnyvale, CA (US); Jeffrey Kimmel, San Jose, CA (US); Steven R. Kleiman, Los Altos, CA (US); Joseph Caradonna, Santa Clara, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1060 days.

This patent is subject to a terminal disclaimer.

(21) Appl. No.: 09/828,271

(22) Filed: Apr. 5, 2001

(51) Int. Cl.
*G06F 9/46* (2006.01)
*G06F 9/50* (2006.01)

(52) U.S. Cl. .................. 718/104; 718/102; 718/106

(58) Field of Classification Search ........... 718/100, 718/102–104, 105, 106–108; 710/200
See application file for complete search history.

(56) References Cited

U.S. PATENT DOCUMENTS

| | | | |
|---|---|---|---|
| 4,333,144 A | | 6/1982 | Whiteside et al. |
| 4,459,664 A | | 7/1984 | Pottier et al. |
| 4,488,231 A | | 12/1984 | Yu et al. |
| 4,494,188 A | | 1/1985 | Nakane et al. |
| 4,742,447 A | | 5/1988 | Duvall et al. |
| 4,742,450 A | | 5/1988 | Duvall et al. |
| 4,785,392 A | | 11/1988 | Maier et al. |
| 4,875,159 A | | 10/1989 | Cary et al. |
| 4,914,583 A | | 4/1990 | Weisshaar et al. |
| 5,043,873 A | * | 8/1991 | Muramatsu et al. ......... 711/119 |
| 5,253,359 A | * | 10/1993 | Spix et al. ..................... 714/46 |
| 5,280,614 A | * | 1/1994 | Munroe et al. .............. 718/107 |

(Continued)

FOREIGN PATENT DOCUMENTS

DE  694 25 658 T2  4/2001

(Continued)

OTHER PUBLICATIONS

Powell et al., "Process Migration in DEMOS/MP". Computer Science Division, Dept of Electrical Engineering and computer sciences, ACM 1983.*

(Continued)

*Primary Examiner*—Li B Zhen
(74) *Attorney, Agent, or Firm*—Blakely, Sokoloff, Taylor & Zafman LLP (57) ABSTRACT

The invention provides a method and system for scheduling tasks in an MP system, and provides parallel execution of those tasks while implicitly synchronizing access to resources used by that system. Tasks in the system are each assigned to a scheduling domain, thus associating those tasks with a set of resources controlled by that domain. A scheduler operating at each processor implicitly synchronizes those resources controlled by each domain, by scheduling only one task for each domain to execute concurrently in the system. Because each instance of the scheduler selects which task is next run independently of its processor, each domain can migrate from one processor to another; thus, each domain can have a task executing on any processor, so long as no domain has two tasks executing concurrently in the system. Thus, domains are not bound to any particular processor. Hence the method and system are symmetric.

13 Claims, 6 Drawing Sheets

U.S. PATENT DOCUMENTS

| | | | |
|---|---|---|---|
| 5,297,265 A | | 3/1994 | Frank et al. |
| 5,307,483 A | * | 4/1994 | Knipfer et al. ............... 714/10 |
| 5,327,556 A | * | 7/1994 | Mohan et al. ................ 707/8 |
| 5,357,612 A | | 10/1994 | Alaiwan |
| 5,454,095 A | | 9/1995 | Kraemer et al. |
| 5,481,706 A | * | 1/1996 | Peek ......................... 710/200 |
| 5,481,747 A | * | 1/1996 | Kametani ................. 718/102 |
| 5,502,840 A | * | 3/1996 | Barton ...................... 710/200 |
| 5,590,326 A | * | 12/1996 | Manabe .................... 711/150 |
| 5,644,709 A | | 7/1997 | Austin |
| 5,790,851 A | * | 8/1998 | Frank et al. ............... 718/104 |
| 5,815,727 A | * | 9/1998 | Motomura ................... 712/1 |
| 5,826,081 A | * | 10/1998 | Zolnowsky ............... 718/103 |
| 5,872,909 A | | 2/1999 | Wilner et al. |
| 5,894,555 A | * | 4/1999 | Harada et al. ............. 709/213 |
| 5,931,938 A | * | 8/1999 | Drogichen et al. ........... 712/15 |
| 5,940,828 A | * | 8/1999 | Anaya et al. .................. 707/8 |
| 5,963,962 A | | 10/1999 | Hitz et al. |
| 6,105,053 A | * | 8/2000 | Kimmel et al. ............ 718/105 |
| 6,151,618 A | * | 11/2000 | Wahbe et al. ................ 718/1 |
| 6,269,390 B1 | * | 7/2001 | Boland ...................... 718/100 |
| 6,289,369 B1 | * | 9/2001 | Sundaresan ............... 718/103 |
| 6,345,240 B1 | * | 2/2002 | Havens ....................... 703/21 |
| 6,366,945 B1 | * | 4/2002 | Fong et al. ................. 718/104 |
| 6,378,066 B1 | * | 4/2002 | Lewis ........................ 712/236 |
| 6,434,631 B1 | * | 8/2002 | Bruno et al. .................. 710/6 |
| 6,470,375 B1 | * | 10/2002 | Whitner et al. ............ 718/105 |
| 6,502,122 B1 | * | 12/2002 | Takeuchi ................... 718/101 |
| 6,546,546 B1 | * | 4/2003 | Van Doorn ................. 717/114 |
| 6,604,123 B1 | * | 8/2003 | Bruno et al. ............... 718/100 |
| 6,622,155 B1 | * | 9/2003 | Haddon et al. ............ 718/700 |
| 6,658,449 B1 | * | 12/2003 | Brenner et al. ............ 718/105 |
| 6,662,252 B1 | * | 12/2003 | Marshall et al. ........... 710/200 |
| 6,714,960 B1 | * | 3/2004 | Bitar et al. ................ 718/103 |
| 6,728,959 B1 | * | 4/2004 | Merkey ..................... 718/102 |
| 6,745,222 B1 | * | 6/2004 | Jones et al. ................ 718/107 |
| 6,779,182 B1 | * | 8/2004 | Zolnowsky ............... 718/103 |
| 6,801,943 B1 | * | 10/2004 | Pavan et al. ............... 709/226 |
| 7,213,247 B1 | * | 5/2007 | Wilner et al. ............. 718/100 |
| 7,290,260 B2 | | 10/2007 | Miller |
| 7,337,442 B2 | | 2/2008 | VoBa et al. |
| 2001/0036181 A1 | * | 11/2001 | Rogers ..................... 370/389 |
| 2001/0037408 A1 | * | 11/2001 | Thrift et al. ............... 709/310 |
| 2001/0037450 A1 | | 11/2001 | Metlitski et al. |
| 2001/0042139 A1 | * | 11/2001 | Jeffords et al. ............ 709/316 |
| 2002/0026342 A1 | * | 2/2002 | Lane et al. .................... 705/8 |
| 2002/0091748 A1 | * | 7/2002 | Rehg et al. ................ 709/107 |
| 2004/0117531 A1 | * | 6/2004 | McKenney ................ 710/200 |

FOREIGN PATENT DOCUMENTS

| | | | |
|---|---|---|---|
| EP | 145889 A | * | 6/1985 |
| EP | 0 702 815 B1 | | 8/2000 |
| JP | 2001167060 A | * | 6/2001 |
| WO | WO 94/29807 A1 | | 12/1994 |

OTHER PUBLICATIONS

Dror G. Feitelson and Larry Rudolph, "Parallel Job Scheduling: Issues and Approaches," 1995, pp. 1-18.*

"IA-32 Intel Architecture Software Developer's Manual. vol. 3: System Programming Guide," 2004, 26 pgs, Intel Corporation.

Dianne E. Britton and Mark E. Stickel; An Interprocess Communication Facility for Distributed Applications; RCE Laboratories; David Sarnoff Research Center; Princeton, New Jersey; IEEE 1980; pp. 590-595.

David R. Cheriton; Multi-Process Structuring and the Thoth Operating System; Department of Computer Science; Univeristy of British Columbia, Vancouver, B.C. Canada; Mar. 1979, pp. 1-64.

David R. Cheriton; The Thoth System: Multi-Process Structuring and Portability; Operating and Programming Systems Series; The Computer Science Library. Elsevier Science Publishing Co. 1982, 18 pages.

David R. Cheriton et al.; Thoth, A Portable Real-Time Operating System; vol. 22; Feb. 1979; pp. 105-115. Operations Systems, Communications of the ACM, University of Waterloo.

Anita K. Jones et al.; StarOS, a Multiprocessor Operating System for the Support of Task Forces; Department of Computer Science Carnegie-Mellon University, Pittsburg, Pennsylvania; 1979.

Keith A. Lantz et al.; Rochester's Intelligent Gateway; IEEE; Oct. 1982.

Michael A. Malcolm; A Process Abstraction and its Application; Department of Computer Science; University of Waterloo; Waterloo, Ontario; Proc. Eighth Manitoba Conference on Numerical Math. and Computing, 1978; pp. 33-50.

Bruce Nelson and Yu-Ping Cheng; The Myth of Transfer Rate—How and Why SCSI Is Better than IPI for NFS; Technical Report 6, Second Edition-Auspex; Jul. 1992.

Slashdot: Tux2: The Filesystem That Would Be King—Microsoft Internet Explorer. Oct. 20, 2000.

* cited by examiner

SYMMETRIC MULTIPROCESSOR SYNCHRONIZATION USING MIGRATING SCHEDULING DOMAINS

BACKGROUND OF THE INVENTION

1. Field of the Invention

This invention relates to symmetric multiprocessor synchronization and implicit synchronization of resources using migrating scheduling domains, as described herein.

2. Related Art

In computer systems having multiple processors with concurrent execution, it is desirable to use as much of the parallelism as possible from the multiple processors. One problem with using the parallelism of multiple processors is that of designing software to make use of that parallelism. For example, software that was designed for use with a uniprocessor system often does not exploit the parallelism of a multiprocessor system to the fullest extent possible.

A first known method is to redesign or rewrite software originally designed for use with a uniprocessor system, so as to make use of the advantages of a multiprocessor system. While this known method does generally achieve the goal of using the advantages of a multiprocessor system, it is subject to several drawbacks. First, it is extremely expensive, in that it uses relatively large amounts of (human design and coding) resources for redesigning or rewriting program code. Second, it is sometimes then necessary to maintain two different code bases, one for uniprocessor systems and one for multiprocessor systems, also resulting in additional expense and use of human design and coding resources.

A second known method is to introduce (into software originally designed for use with a uniprocessor system) those explicit synchronization methods for maintaining integrity of resources to be shared among multiple processors. While this known method generally achieves the same goal with relatively less expense and consumption of resources than a complete redesign or rewrite of the software code base, it also suffers from several drawbacks. First, it introduces a relatively large amount of new code subject to possible error in coding. Second, it introduces additional processor and memory usage to implement known explicit synchronization methods (such as locking mechanisms), with resulting slowing of the system using those known explicit synchronization methods. The second drawback is particularly exacerbated for resources that are primarily used by only one software element, but find occasional use by a second software element; the first software element pays the price of known explicit synchronization methods for each use of the resource, even though contention for that resource might be relatively rare. Moreover, these drawbacks for this second known method are also applicable to the first known method, as a new design would likely employ explicit synchronization methods.

A third known method is to identify (within software originally designed for use with a uniprocessor system) those functional elements that can each independently operate without using known explicit synchronization methods. An example of this third known method is shown in U.S. Pat. No. 5,485,579; in that patent, each separated functional element is bound to a single processor in a multiprocessor system, so that the system can assure that each processor is performing functions that do not require known explicit synchronization methods. While this method generally achieves the goal of using the advantages of a multiprocessor system, it is subject to several drawbacks. First, the mapping between separated functional elements and processors is 1:1, so if the number of separated functional elements differs from the number of processors, the system will either underutilize at least some of the processors or underperform the functions of at least some of the separated functional elements. Second, there is no provision for load balancing among the multiple processors. Third, there is no useful technique for altering the code base so as to make use of greater parallelism, without resorting to the first known method described above.

Accordingly, it would be advantageous to provide a technique for scheduling a set of tasks in a multiprocessor system that is not subject to drawbacks of the known art. In a preferred embodiment, this is achieved using a method and system for providing parallel execution of those tasks while implicitly synchronizing access to a set of resources (such as data structures or hardware devices) used by that system.

SUMMARY OF THE INVENTION

The invention provides a method and system for scheduling a set of tasks in an MP (multiprocessor) system, and provides parallel execution of those tasks while implicitly synchronizing access to a set of resources (such as data structures or hardware devices) used by that system. Tasks in the MP system are each assigned to a scheduling domain, thus associating those tasks with a set of resources controlled by that domain. A scheduler operating at each processor in the MP system implicitly synchronizes those resources controlled by each domain, by scheduling only one task for each domain to execute concurrently in the system. Because each instance of the scheduler selects which task is next run independently of its processor, each domain can migrate from one processor to another; thus, each domain can have a task executing on any processor, so long as no domain has two tasks executing concurrently in the system. Thus, domains (and their tasks) are not bound to any particular processor. Hence the method and system are symmetric.

A preferred embodiment uses the implicit synchronization enforced by the scheduler for resources controlled by a single domain, and performs explicit synchronization only for resources shared by more than one domain. When a resource is needed by a task in a first domain but controlled by a second domain, the task can re-designate itself (and thus switch) from the first to the second domain; this allows execution by other tasks in the first domain, while preserving domain scheduling heuristics. This technique provides for implicit synchronization of resources controlled by the first domain, so that explicit synchronization is not needed.

A preferred embodiment can designate a set of tasks known to be MP-safe (safe for use in an MP system) to not be assigned to any particular domain, as those tasks can be executed concurrently with all other tasks. MP-safe tasks can include: (a) tasks that do not use any resources controlled by a particular domain, such as tasks that perform only computation and/or keep only their own data structures; (b) tasks that already use explicit synchronization for resources they need; and (c) tasks that are otherwise determined by programmers to not require explicit synchronization.

Those of ordinary skill in the art will recognize, after perusal of this application, the many advantages provided by the invention. These include, but are not limited to, the following:

The invention provides for MP-safe operation of applications originally designed for a UP system without having to substantially rewrite those applications.

The invention provides for MP-safe operation of applications having distinguishable functional elements, without having to incur overhead associated with explicit synchronization.

The invention provides for incrementally altering program code originally designed for a UP (uniprocessor) system to execute in an MP-safe manner on an MP system.

The invention provides for increased parallel use of an MP system without having to assign any functional elements to particular processors. This is particularly valuable where the number of functional elements are greater than the number of particular processors.

The invention provides for improved load balancing among the processors in an MP system.

The invention has general applicability to applications of any kind executing in an MP system in which the scheduler provides implicit synchronization using domains. Although a preferred embodiment is described with regard to a file server, there is no particular limitation of the invention to file servers or similar devices. Techniques used by a preferred embodiment of the invention for implicit synchronization, domain migration, domain switching, and the like can be used in contexts other than the specific applications disclosed herein.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Related Information

Inventions described herein can be used in conjunction with inventions described in the following application(s):

Application Ser. No. 09/828,284, Express Mail Mailing No. EL 734 816 389 US, filed the same day, in the name of inventors Christopher PEAK, Sathya BETTADAPURA, and Jeffrey KIMMEL, titled "Automatic Verification of Scheduling Domain Consistency".

Each of these application(s) is hereby incorporated by reference as if fully set forth herein. They are collectively referred to as the "incorporated disclosures."

Lexicography

The following terms refer or relate to aspects of the invention as described below. The descriptions of general meanings of these terms are not intended to be limiting, only illustrative.

concurrent—in general, overlapping in time. Concurrent access to a resource includes all forms of access in which the data structure or hardware device might be found in an inconsistent state as a consequence of access by more than one task.

execute or run—in general, when the scheduler grants control of a processor to a task to perform the instructions which makeup its program.

executable or runnable—when a task is ready to execute, but has not yet been granted control of a processor (due to priority or scheduling domain restrictions).

MP-safe—in general, suitable for operation in a multiprocessor environment without corruption or loss of data, or improper contention for resources. Techniques that serve to prevent improper concurrent access render their subject MP-safe.

resource—in general, any software or hardware object for which concurrent access would need some form of synchronization for safe operation in a multiprocessor system. Examples of resources include, but are not limited to: data structures, disk drives, modems, NIC cards, NVRAM, PCI devices, sound cards, and other peripherals.

schedule—in general, to select a task for execution or running by a processor. There is no particular requirement that scheduling involves either (a) operation for a selected period of time, or (b) operation in the future. A task is "scheduled" when it is made runnable.

scheduling domain—in general, a set of tasks and resources selected by designers or program coders for operation in a multiprocessor system, where it's understood that only one task in the set is allowed to run and access the resources at any given time. Multiple tasks from different scheduling domains can run concurrently.

symmetric scheduling—in general, scheduling tasks on each processor independent of the identity of the processor. In the invention, the method of scheduling performed on each processor is substantially the same, and no tasks are bound to or special to any particular processor. Thus, a task is just as likely to run on one processor as it is on any other.

synchronize—in general, to protect a resource from improper concurrent access. Known synchronization techniques include explicit synchronization, in which designers or program coders include an explicit synchronization mechanism such as a lock or semaphore. The invention provides implicit synchronization, in which resources are synchronized by operation of the scheduling domain restrictions described herein.

task—in general, any schedulable entity. A task might include a single process, a single thread, or some other individually schedulable entity.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

Figure 1:
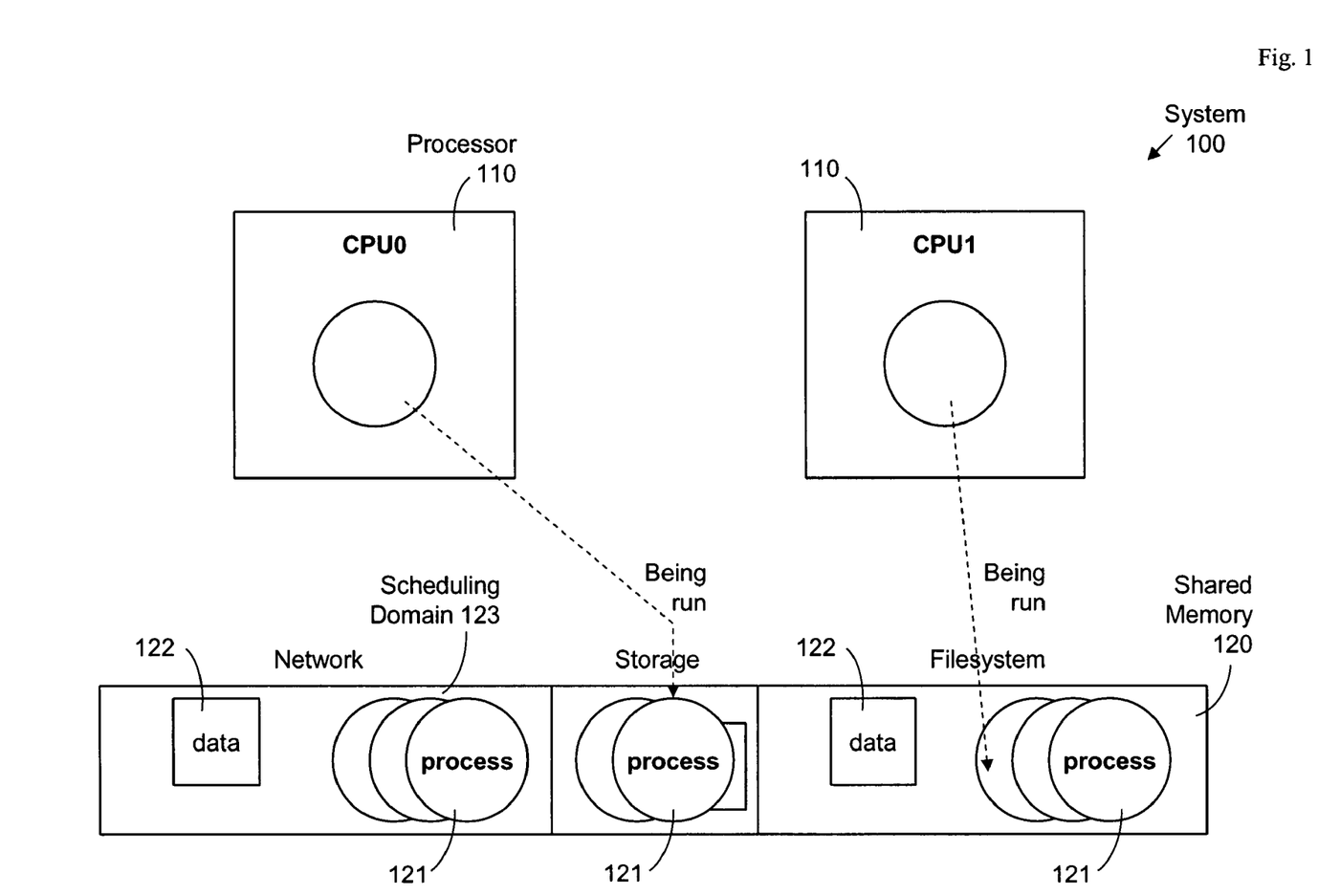
FIG. 1 shows a conceptual diagram of a multiprocessor system including a set of migrating scheduling domains.

FIG. 1 shows a conceptual diagram of a multiprocessor system including a set of migrating scheduling domains.

A system 100 includes a plurality of processors 110 and a shared memory 120.

Each processor 110 has access to the shared memory 120 and to both (executable) tasks 121 and resources 122 therein. The shared memory includes the tasks 121 and the resources 112 to be used by those tasks. Tasks 121 and resources 122 are each associated with a single scheduling domain 123 (with exceptions as described below). Thus, for example, in a preferred embodiment there are three scheduling domains 123 called "Network", "Storage", and "Filesystem", each of which has associated therewith one or more tasks 121 and one or more resources 122. Each processor 110 schedules only those tasks 121 within scheduling domains 123 not already in use by other processors 110, so that each scheduling domain 123 is associated with only one processor 110 at a time. At each moment, each processor 110 executes a task 121 associated with only a single one of the scheduling domains 123.

As described herein, scheduling domains 123 are not bound or fixed to any particular processor 110 forever, or even for any specific time period. Each processor 110 schedules its tasks 121 independently of which processor 110 is performing the scheduling (that is, scheduling is symmetric with regard to processors 110), so it is possible for any scheduling domain 123 to be associated to any processor 110 from time to time, subject only to the restriction, as further described below, that each scheduling domain 123 can be associated with only one processor 110 at a time. Since tasks 121 within a scheduling domain 123 can be executed at one time by one processor 110 and at another time by a different processor 110, scheduling domains 123 are said to be able to "migrate" from one processor 110 to another.

As described herein, resources 122 can include data structures, devices, and other objects for which concurrent access by more than one task 121 would need some form of synchronization for safe operation in a multiprocessor system. Although the description herein primarily refers to resources 122 as data structures, there is no particular limitation of resources 122 to only data structures in a general form of the invention.

Scheduling Domain Structure

Figure 2:
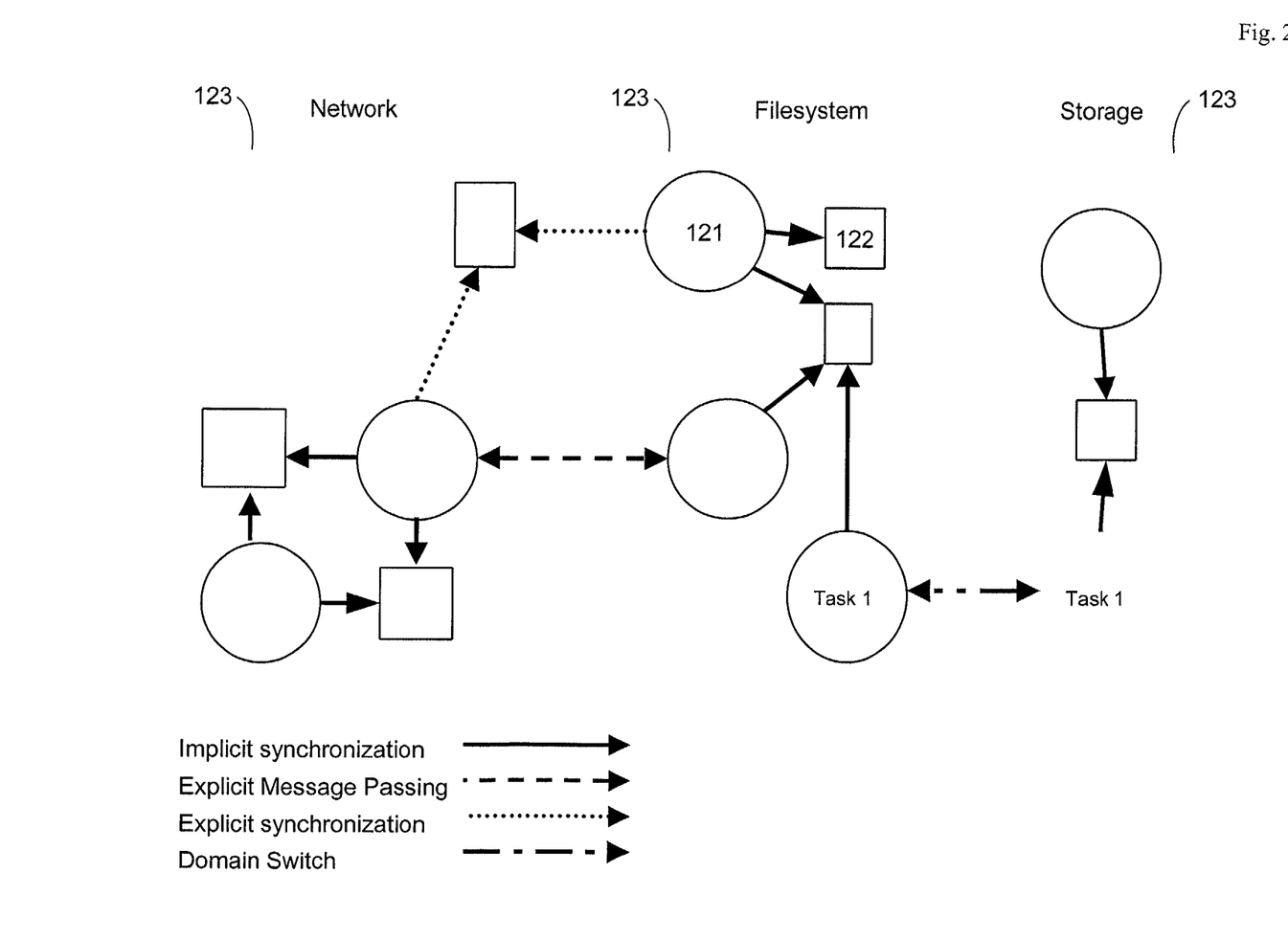
FIG. 2 shows a diagram of scheduling domains, the tasks and resources that reside in them, and the resource access methods.

FIG. 2 shows a diagram of scheduling domains, the tasks and resources that reside in them, and the resource access methods.

The system 100 includes a plurality of scheduling domains 123, each including a set of possibly runnable tasks 121 and a set of resources 122. Resource access is possible via one or more of, or some combination of, the following:

A task 121 can directly read data from, or write data to, a resource 122 in the same scheduling domain 123.

When a task 121 reads data from, or writes data to, a resource 122 in the same scheduling domain 123, that interface between the task 121 and the resource 122 is considered MP-safe (safe for multiprocessor operation), because resources 122 are implicitly synchronized by the system 100, as described below.

A task 121 can directly read data from, or write data to, a resource 122 in a different scheduling domain 123 (or a resource 122 not assigned to any scheduling domain 123).

When a task 121 directly reads data from, or writes data to, a resource 122 in a different scheduling domain 123 (or a resource 122 not assigned to any scheduling domain 123), that interface between the task 121 and the resource 122 is not considered MP-safe, unless the resource 122 is explicitly synchronized using an explicit synchronization technique, as described below.

A task 121 can access data from another domain by proxy. That is, a message can be sent to a server task, which resides in the target domain. The server task accesses the data directly (on behalf of it's client), and then passes the results back to the client task.

A task 121 can switch from a first scheduling domain 123 to a second scheduling domain 123.

Figure 4:
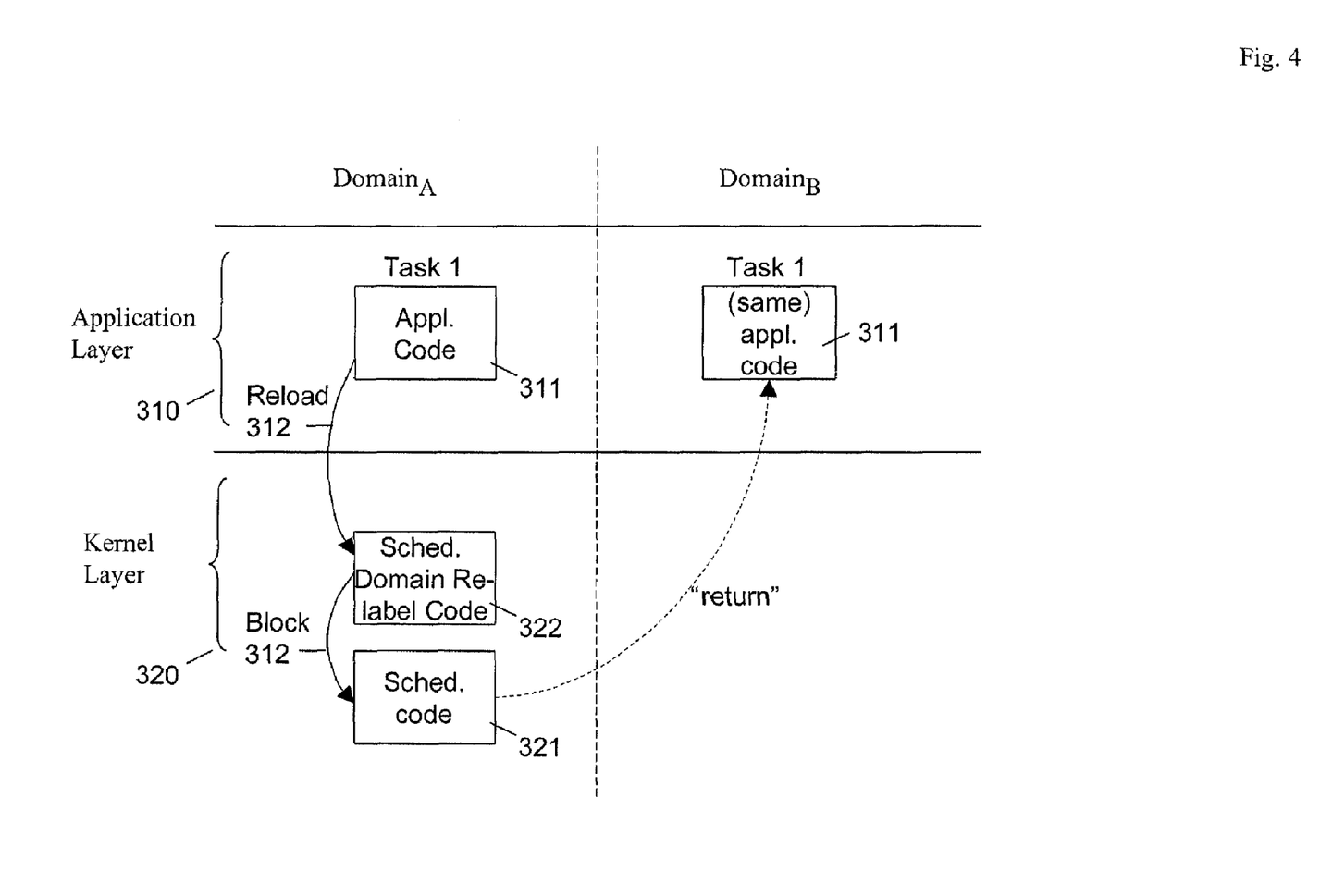
FIG. 4 shows a conceptual diagram of symmetric scheduling in which tasks can switch scheduling domains.

FIG. 4 shows a conceptual diagram of scheduling in which tasks can switch scheduling domains.

Each task 121 includes an associated label indicating to which scheduling domain 123 the task 121 belongs. The task's application code 311 in the application layer 310 performs a "relabel-this-task" system call 313 to scheduler code 322 in the kernel layer 320.

Figure 3:
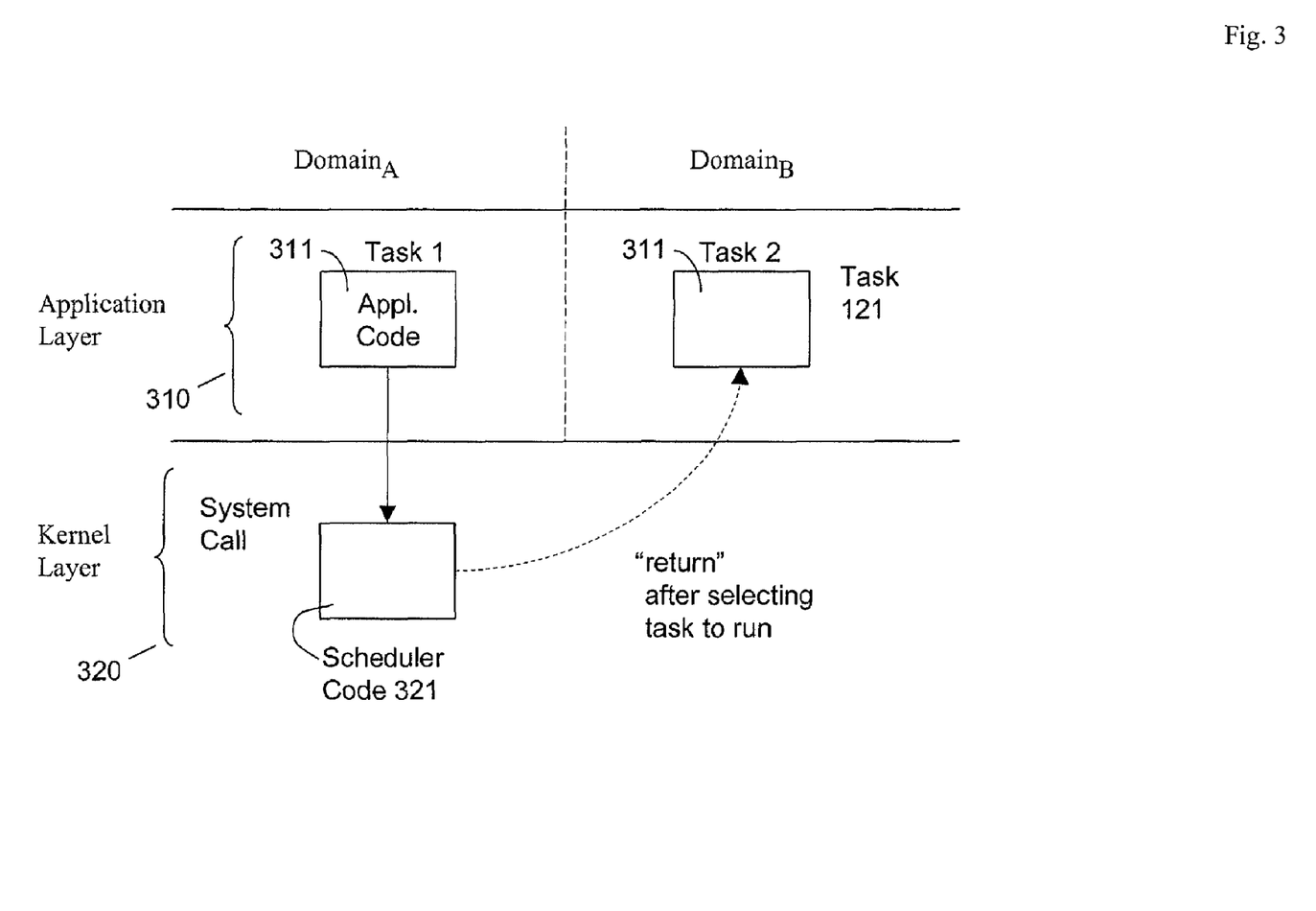
FIG. 3 shows a conceptual diagram of symmetric scheduling using a set of migrating scheduling domains.

Similar to the description with regard to FIG. 3, the application code 311 makes the system call 312 to transfer control to the scheduler code 322. The scheduler code 322 alters the task's associated label, thus changing the task's scheduling domain 123, and places the transferor task 121 on the runnable queue 550 (in its proper location in response to its relative priority). The relabel code 322 transfers control to the scheduler code 321, which (as described with regard to FIG. 3) selects a next task 121 to execute, performs a context switch into that next task 121, and "returns" to a second set of application code 312 in that next task 121.

Unlike the operation of scheduler code 321 with regard to FIG. 3, in this figure the scheduler code 321 "returns" back to the same application code 311 in the "next" task 121. As a consequence, the task 121 continues to execute the same application code 311, but with a new label indicating that the task 121 belongs to a different scheduling domain 123.

Since the scheduler refuses to schedule more than one task 121 from the originating scheduling domain 123, if the task 121 attempts to switch domains into a scheduling domain 123 that is already in use (that is, there is already a task executing that belongs to the target scheduling domain 123), the task 121 will not be selected for execution, and will block until at least that scheduling domain 123 is freed for use. Because the task 121 has been relabeled when the scheduler selects the next task 121, the scheduler is willing to schedule another task 121 from the "old" scheduling domain 121. For example, if a task 121 in the "Network" scheduling domain 123 switches into the "Storage" scheduling domain 123, the "Network" scheduling domain 123 is freed for use by other tasks 121 in that domain, while the "Storage" scheduling domain 123 is occupied by the switching task 121 and not available for use by other tasks 121.

A task 121 can release control of its processor allowing another task to run, which is either in the same or a different scheduling domain 123.

When a task 121 releases its processor, the task 121 invokes the scheduler (that is, the part of the operating system that performs task scheduling), which determines which task 121 is next to run on the same processor 110. The scheduler chooses a next task 121 to run independent of which processor 110 it is invoked on, but in response to which scheduling domains are being executed on other processors 110. The scheduler does not select any task 121 that would cause a scheduling domain 123 to be executed on more than one processor 110 at once.

Transfer of control from one task 121 to another can result in a different task from the same domain being run immediately. However, it is possible that the scheduler will select a different, higher priority, task 121 from a different scheduling domain so that the transfer of control will result in that higher priority task 121 being run instead.

Symmetric Scheduling

FIG. 3 shows a conceptual diagram of symmetric scheduling using a set of migrating scheduling domains.

Each task 121 is able to invoke a scheduler on the processor 110 on which it is executing. The scheduler is independent of which processor on which it is running (although in alternative embodiments, it may be that the scheduler takes into account which processor on which it is running, such as for load-balancing or cache affinity purposes, while still allowing scheduling domains 123 to migrate from one processor 110 to another). The figure shows a task 121 invoking the scheduler and causing a context switch to a different task 121 in a different scheduling domain 123.

The task 121 includes application code 311 in an application layer 310 of a computing system on its processor 110. The application code 311 performs a system call that results in invoking the scheduler code 321 in a kernel layer 320 of the computing system. Application layers, kernel layers, and system calls are known in the art of operating systems.

The application code 311 makes the system call 312 which transfers control to the scheduler code 321. The scheduler code 321 selects a next task 121 to execute, performs a context switch into that next task 121, and "returns" to a second set of application code 312 in that next task 121. Unlike known schedulers, the scheduler code 321 selects only those tasks 121 capable of running without causing a scheduling domain 123 to be running on two different processors 110 concurrently.

Method of Scheduling

Figure 5:
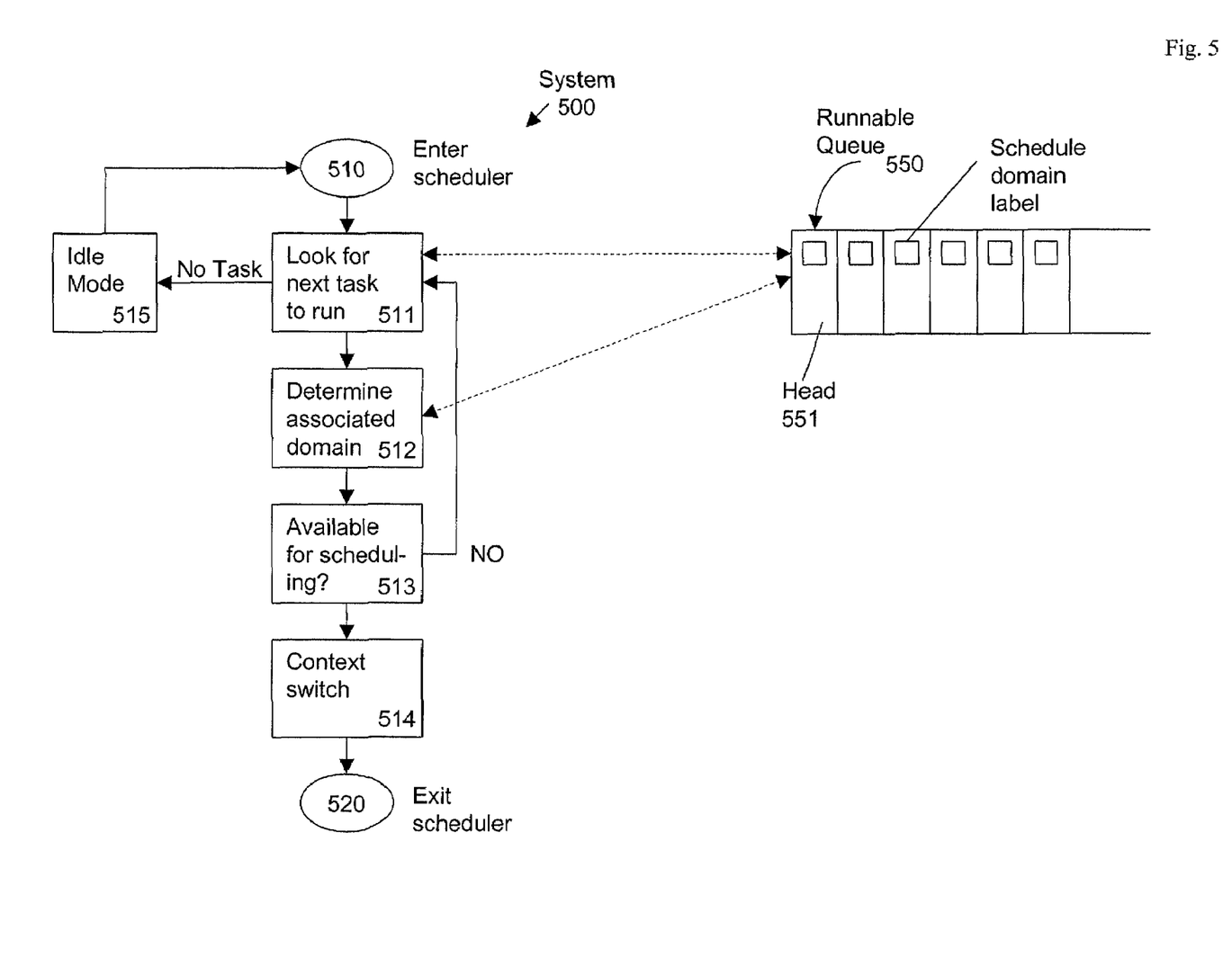
FIG. 5 shows a process flow diagram of a symmetric scheduler using a set of migrating scheduling domains.

FIG. 5 shows a process flow diagram of a symmetric scheduler using a set of migrating scheduling domains.

A method 500 includes a set of flow points and process steps as described herein.

At a flow point 510, application code 311 makes the system call 312 to invoke scheduler code 321, and the scheduler is entered. The scheduler uses a queue 550 of runnable tasks 121, each of which is labeled with a scheduling domain 123 associated with that task 121. The queue 550 includes a head 551 of the queue 550, which identifies a particular task 121.

At a step 511, the scheduler examines the queue 550 for a next runnable task 121. If there is no such task 121 (that is, the queue 550 is empty or has been completely traced down), the scheduler goes into an idle mode and proceeds with the flow point 510. (Thus, the idle mode can be entered in one of two different ways: first, if there is no next task 121 to run, that is, the runnable queue 550 is empty; second, if there is no task 121 on the runnable queue 550 capable of being run, due to scheduling domain 123 restrictions.) If there is such a task 121, the scheduler proceeds with the next step.

In alternative embodiments, the runnable queue 550 may be separated into a separate runnable queue per scheduling domain 123. This implementation may optimize (speed-up) the scheduler lookup and queue functions.

At a step 512, the scheduler examines the task 121 at the identified position in the queue 550, and determines which scheduling domain 123 the task 121 is associated with.

At a step 513, the scheduler determines if that scheduling domain 123 is available for scheduling. If so, the scheduler proceeds with the flow point 514. If not, the scheduler proceeds with the step 511.

At a step 514, the scheduler prepares to run the selected new task 121. The scheduler performs a context switch into the selected new task 121, and proceeds with the flow point 520.

At a flow point 520, processor 110 is running the selected task's application code 312.

Synchronization, Explicit or Implicit

Figure 6:
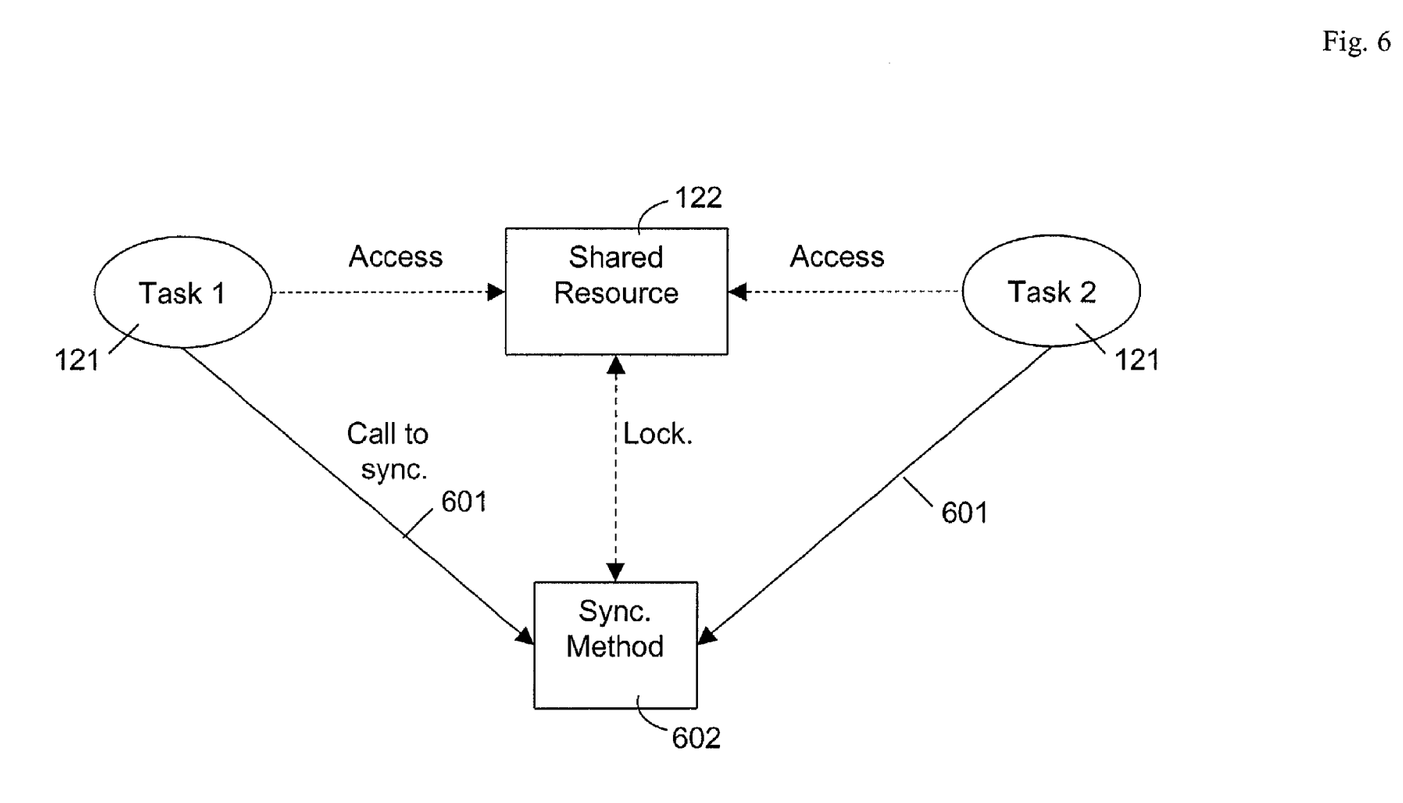
FIG. 6 shows a conceptual diagram of explicit synchronization and implicit synchronization.

FIG. 6 shows a conceptual diagram of explicit synchronization and implicit synchronization.

With explicit synchronization, a first task 121 and a second task 121 each attempt to access a shared resource 122, such as a data structure. To prevent improper concurrent access to the shared resource 122, each task 121 makes explicit calls 601 to a synchronization mechanism 602. The synchronization mechanism 602 might include a lock, a semaphore, a monitor, or other methods known in the art of operating systems.

With implicit synchronization, it is assumed by the application that the scheduler will provide the synchronization, by not running multiple tasks in the same domain concurrently. The first task 121 and the second task 121 each have an associated scheduling domain 123. If the two scheduling domains 123 are different, that indicates a designer's or program coder's decision that the two tasks 121 will not perform improper concurrent access to the shared resource 122 (in alternative embodiments, different scheduling domains 123 may indicate that if there is any improper concurrent access to the shared resource 122, no harm will come to the system 100). If the two scheduling domains 123 are the same, that indicates a designer's or program coder's decision that the two tasks 121 might perform improper concurrent access to the shared resource 122, thus that the two tasks 121 are not allowed to execute concurrently.

The scheduler prevents concurrent execution of the two tasks 121, and therefore prevents concurrent access to the shared resource 122, as a consequence of the steps 512 and 513 described above. Because the scheduler refuses to schedule two tasks 121 for concurrent execution on different processors 110 when those two tasks 121 are associated with the same scheduling domain 123, the two tasks 121 are implicitly synchronized with regard to the shared resource 122. The resource 122 is therefore also associated with the same scheduling domain 123. Lack of improper concurrent access to the resource 122 is therefore an emergent consequence of the scheduler's behavior in refusing to concurrently schedule tasks 121 from the same scheduling domain 123.

Tasks and Resources not in any Domain

Tasks 121 or resources 122 can also be declared by the designer or program coder to not be in any scheduling domain 123.

If a task 121 is not in any domain, the designer or program coder thus indicates that the task 121 is MP-safe, that is, that running the task 121 will not result in any improper concurrent access to any resources 122. A task 121 can be declared MP-safe for one or more of the following reasons:

The task 121 does not use any resources 122, or all of its resources are internal to the task 121.

For example, the task 121 might perform only operations on data structures given to it by a requesting task 121, or the task 121 might use only its own internal data structures (dynamically allocated by the operating system, not static). One example could be when the task 121 performs an operation that does not involve use of resources 122, such as a pure calculation.

The task 121 already uses explicit synchronization methods to assure it is MP-safe.

For example, the task 121 might use locks or semaphores to maintain all its data structures or other resources 122 MP-safe. A first example could be when the task 121 is part of the kernel and was already designed to be MP-safe. A second example could be when the task 121 is designed or coded explicitly for safe use in a multiprocessor system.

Designers or program coders decide that the task's nature is such that it will not involve improper concurrent access.

For example, although the task 121 is not formally MP-safe, and does use resources 122 that are not formally MP-safe, designers or program coders knowing the nature of the system 100 might have decided that the task 121 will not ever be run, in normal operation, in an unsafe circumstance.

Designers or program coders decide that the task's nature is such that, even if it does involve improper concurrent access, that improper concurrent access would be harmless.

For example, although the task 121 might be able to perform improper concurrent access, designers or program coders knowing the nature of the system 100 might have decided that in that event, the resources 122 that are improperly accessed do not need to be maintained consistent, or that there are adequate recovery procedures from that event.

If a resource 122 is not in any domain, the designer or program coder thus indicates that the resource 122 is MP-safe, that is, that using the resource 122 will not result in any improper concurrent access. A resource 122, and any library code which may maintain the resource, can be declared MP-safe for one or more of the following reasons:

The resource 122 already uses explicit synchronization methods to assure it is MP-safe.

For example, the resource 122 might require locks or semaphores to be accessed.

Designers or program coders decide that the resource's nature is such that it will not involve improper concurrent access.

For example, although the resource 122 is not formally MP-safe, and might be used concurrently by multiple tasks 121, designers or program coders knowing the nature of the system 100 might have decided that the task 121 will not ever be run, in normal operation, in an unsafe circumstance.

Designers or program coders decide that the resource's nature is such that, even if it does involve improper concurrent access, that improper concurrent access would be harmless.

For example, although the resource 122 might be able to be concurrently accessed, designers or program coders knowing the nature of the system 100 might have decided that in that event, the resource 122 does not need to be maintained consistent, or that there are adequate recovery procedures from that event.

Tasks and Resources in More than One Domain

Tasks 121 or resources 122 can also be declared by the designer or program coder to be in more than one scheduling domain 123.

In a preferred embodiment, a task 121 can perform a system call to "grab" a second scheduling domain 123 for a period of time. In this case, both the task's first scheduling domain 123 and the task's second scheduling domain 123 are not free for concurrent use by other tasks 121.

In a preferred embodiment, designers or program coders can declare a resource 122 to be "part of" both a first scheduling domain 123 and a second scheduling domain 123.

Preemptive Multitasking

A preferred embodiment described herein uses non-preemptive multitasking; that is, a task 121 only blocks if it makes the appropriate system call to the scheduler to block itself and allow another task 121 to run.

In a system 100 using preemptive multitasking, a task 121 can be preempted "against its will," that is, without the task 121 necessarily having a chance to assure that all its resources 122 or other data structures are in order for another task 121 to run. In this case, the task 121 might have left one or more resources 122 in a state that disallows other tasks 121 from the same scheduling domain 123 from accessing those resources 122. Accordingly, in alternative embodiments using preemptive multitasking, when a task 121 is preempted, it becomes the only next task 121 from its scheduling domain 123 able to next run. Thus, the scheduler will select, from each scheduling domain 123, the preempted task 121 over all other tasks 121 in that scheduling domain 123.

Generality of the Invention

The invention has general applicability to applications of any kind executing in an MP system in which the scheduler provides implicit synchronization using domains. Although a preferred embodiment is described with regard to a file server, there is no particular limitation of the invention to file servers or similar devices. Techniques used by a preferred embodiment of the invention for implicit synchronization, domain migration, domain switching, and the like can be used in contexts other than the specific applications disclosed herein.

The invention is generally applicable to all applications capable of being run in a multiprocessor system, and to any multiprocessor system in which the scheduler (or equivalent part of an operating system) can be used to enforce implicit synchronization as described herein.

Other and further applications of the invention in its most general form would be clear to those skilled in the art after perusal of this application. The invention 18 would be usable for such other and further applications without undue experimentation or further invention.

Although preferred embodiments are disclosed herein, many variations are possible which remain within the concept, scope and spirit of the invention; these variations would be clear to those skilled in the art after perusal of this application.

The invention claimed is:

1. A method comprising:
running a plurality of tasks in a multiprocessor system that includes a plurality of processors, each processor having an identity;
scheduling the plurality of tasks using a plurality of scheduling domains by scheduling tasks on a processor independent of the identity of the processor, wherein none of the plurality of scheduling domains is bound to any one processor of the plurality of processors;
implicitly synchronizing the tasks with regard to one or more resources shared by the tasks in said system by associating said tasks with the scheduling domains, wherein each of the one or more resources is assigned to one of the scheduling domains and is not subject to domain migration, wherein implicitly synchronizing the tasks comprises prohibiting tasks that are each associated with a same scheduling domain from running concurrently, and allowing tasks that are each associated with different scheduling domains to run concurrently; and changing association of a task of the plurality of tasks from a first scheduling domain to a second scheduling domain, if the task requires one of the shared resources assigned to the second scheduling domain.

2. A system comprising:

a plurality of processors, each processor having an identity;

a memory coupled to each of the plurality of processors, the memory storing data defining a set of tasks, each task of the set of tasks being runnable on more than one of said processors, each said task being associated with one of a plurality of scheduling domains, each of the plurality of scheduling domains controlling one or more shared resources, wherein each of the shared resources is not subject to domain migration; and a scheduler to schedule the set of tasks using a plurality of scheduling domains by scheduling tasks on a processor independent of the identity of the processor, wherein none of the plurality of scheduling domains is bound to any one processor of the plurality of processors, where the scheduler prohibits tasks that are each associated with a same scheduling domain from running concurrently but allows tasks that are each associated with a different one of the plurality of scheduling domains to run concurrently, and wherein the scheduler changes association of a task of the set of tasks from a first scheduling domain to a second scheduling domain if the task requires one of the shared resources controlled by the second scheduling domain.

3. A system as in claim 2, wherein at least one of the set of tasks is associated with more than one scheduling domain of the plurality of scheduling domains.

4. A system as in claim 2, wherein said scheduler includes a plurality of runnable queues, one per scheduling domain.

5. A process comprising:

scheduling a plurality of tasks in a multiprocessor system that includes a plurality of processors, each processor having an identity, by scheduling tasks on a processor independent of the identity of the processor, wherein none of the plurality of scheduling domains is bound to any one processor of the plurality of processors;

performing implicit synchronization of the plurality of tasks, said implicit synchronization dividing said tasks into the scheduling domains, at least one of the scheduling domains being associated with at least two tasks of the plurality of tasks and a resource shared by the at least two tasks, wherein the shared resource is not subject to domain migration, and wherein tasks within a same scheduling domain are prohibited from running concurrently even if run on different processors and tasks that are each from a different scheduling domain are allowed to run concurrently; and moving a task of the plurality of tasks from a first scheduling domain to a second scheduling domain, if the task requires one of the shared resources controlled by the second scheduling domain.

6. A method of scheduling a plurality of processes in a multiprocessor system, the method comprising:

associating the plurality of processes with a plurality of scheduling domains wherein none of the plurality of scheduling domains is bound to any one processor in the system, and wherein each of the processes is executed by a processor independent of an identity of the processor;

implicitly synchronizing the plurality of processes with regard to one or more shared resources by prohibiting concurrently executing processes that are each associated with a same scheduling domain but allowing concurrently executing processes that are each associated with a different one of the plurality of scheduling domains, wherein each of the shared resources is assigned to one of the scheduling domains and is not subject to domain migration; and changing association of a first process of the plurality of processes from a first scheduling domain to a second scheduling domain, if the first process requires one of the shared resources associated with the second scheduling domain.

7. The method of claim 6 further comprising allowing concurrently executing processes that are not associated with any one of the plurality of scheduling domains.

8. The method of claim 6, wherein at least one of the plurality of processes is associated with more than one of the plurality of scheduling domains.

9. The method of claim 6, wherein each of the plurality of scheduling domains is associated with a different one of a plurality of runnable queues.

10. A method implemented in a multiprocessor system, the method comprising:

executing a software program that defines a plurality of tasks and assigns each of the plurality of tasks to one of a plurality of scheduling domains, wherein none of the plurality of scheduling domains is bound to any one processor in the system;

running a plurality of processes, each of the plurality of processes performing a different one of the plurality of tasks, wherein each of the plurality of processes is run by a processor independent of an identity of the processor;

prohibiting concurrently executing processes performing tasks that are each assigned to a same scheduling domain;

allowing concurrently executing processes performing tasks that are each assigned to a different one of the plurality of scheduling domains; and allowing changing assignment of at least one task from a first scheduling domain to a second scheduling domain during executing the software program, if said at least one task requires one of the shared resources assigned to the second scheduling domain, wherein the shared resource is not subject to domain migration.

11. A processing system comprising:

a plurality of processors, each processor having an identity;

a memory coupled to each of the plurality of processors, the memory storing instructions which, when executed by one or more of the plurality of processors, cause the one or more of the plurality of processors to perform a method comprising:

executing a software program associating a plurality of tasks with a plurality of scheduling domains and assigning a plurality of resources to the plurality of scheduling domains, wherein none of the plurality of scheduling domains is bound to any one processor of the plurality of processors, and wherein each task of the plurality of tasks in scheduled on one of the processors independent of the identity of the processor;

prohibiting concurrently executing processes to perform tasks that are each associated with a same scheduling domain but allowing concurrently executing processes to perform tasks that are each associated with a different one of the plurality of scheduling domains; and changing association of a first task of the plurality of tasks from a first scheduling domain to a second scheduling domain, if a process performing the first task requires one of the shared resources assigned to the second scheduling domain, wherein the shared resource is not subject to domain migration.

12. A computer-readable storage medium storing instructions therein which, when executed by one or more processors of a processing system, cause the one or more processors to perform a method comprising:

executing a software program that defines a plurality of tasks and assigns each of the plurality of tasks to one of a plurality of scheduling domains, wherein none of the plurality of scheduling domains is bound to any one processor in the system;

running a plurality of processes, each of the plurality of processes performing a different one of the plurality of tasks, wherein each of the processes is run on a processor independent of the identity of the processor;

prohibiting concurrently executing processes performing tasks that are each assigned to a same scheduling domain;

allowing concurrently executing processes performing tasks that are each assigned to a different one of the plurality of scheduling domains; and allowing changing assignment of at least one task from a first scheduling domain to a second scheduling domain during executing the software program, if said at least one task requires one of the shared resources assigned to the second scheduling domain, wherein the shared resource is not subject to domain migration.

13. A method, comprising:

associating a task of a plurality of tasks with a scheduling domain of a plurality of scheduling domains, wherein the plurality of tasks share one or more resources and each of the one or more resources is assigned to one of the plurality of scheduling domains;

scheduling the task, using the scheduling domain, on a processor in a multiprocessor system that includes a plurality of processors, independent of an identity of the processor;

prohibiting tasks that are each associated with a same scheduling domain from running concurrently;

allowing tasks that are each associated with different scheduling domains to run concurrently; and changing association of the task from a first scheduling domain to a second scheduling domain, if the task requires one of the shared resources assigned to the second scheduling domain, wherein the shared resource is not subject to domain migration.

* * * * *